(12) United States Patent
Shubrick et al.

(10) Patent No.: US 11,783,724 B1
(45) Date of Patent: *Oct. 10, 2023

(54) INTERACTIVE TRAINING APPARATUS USING AUGMENTED REALITY

(71) Applicant: MASSACHUSETTS MUTUAL LIFE INSURANCE COMPANY, Springfield, MA (US)

(72) Inventors: Payton A Shubrick, Springfield, MA (US); Damon Ryan Depaolo, Barkhamsted, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 751 days.

This patent is subject to a terminal disclaimer.

(21) Appl. No.: 16/777,330

(22) Filed: Jan. 30, 2020

Related U.S. Application Data

(60) Provisional application No. 62/805,697, filed on Feb. 14, 2019.

(51) Int. Cl.
*G09B 19/00* (2006.01)
*G09B 5/02* (2006.01)
*G06T 11/00* (2006.01)

(52) U.S. Cl.
CPC .......... *G09B 19/0053* (2013.01); *G06T 11/00* (2013.01); *G09B 5/02* (2013.01); *G06T 2200/24* (2013.01)

(58) Field of Classification Search
CPC .. G09B 19/0053; G06F 3/0484; G06V 20/20; G06T 19/00
See application file for complete search history.

(56) References Cited

U.S. PATENT DOCUMENTS

| | | | | |
|---|---|---|---|---|
| 2018/0018463 | A1* | 1/2018 | Grossman | A63F 13/75 |
| 2018/0027006 | A1* | 1/2018 | Zimmermann | G06F 21/6218 |
| | | | | 726/11 |
| 2019/0019432 | A1* | 1/2019 | Kim | G09B 9/00 |
| 2019/0098039 | A1* | 3/2019 | Gates | G06F 21/6245 |
| 2020/0005540 | A1* | 1/2020 | Challagolla | G06T 19/20 |

* cited by examiner

Primary Examiner — Peter R Egloff
(74) Attorney, Agent, or Firm — Foley & Lardner LLP

(57) ABSTRACT

Disclosed herein is a security training apparatus configured to operate an interactive cybersecurity training application, which provides customized and tailored cybersecurity training to each employee of an organization. The security training apparatus uses augmented reality to facilitate customized cybersecurity training for each user. The augmented reality is a computer application, which deals with the combination of real world images of personal workspace environment of each user where the cyber-crime may occur and computer generated data associated with cybersecurity risk objects that may aid the cyber-crime. The interactive cybersecurity training comprises the use of live video imagery of the personal workspace environment of each user, which is digitally processed and augmented by the addition of computer generated graphics associated with the cybersecurity risk objects. The cybersecurity risk objects are selected based on the items within the personal workspace environment for each user.

16 Claims, 5 Drawing Sheets

INTERACTIVE TRAINING APPARATUS USING AUGMENTED REALITY

CROSS-REFERENCE TO RELATED APPLICATIONS

This application claims priority to U.S. Provisional Patent Application Serial No. 62/805,697, filed Feb. 14, 2019, which is incorporated herein by reference in its entirety.

TECHNICAL FIELD

This application relates generally to field of training apparatus, and more specifically, this application relates to interactive cybersecurity training apparatus using augmented reality.

BACKGROUND

Administrators of various organizations carry out precautionary measures to help protect their business processes and sensitive data while concerns have greatly increased due to increased cyber-crime activities. For instance, the administrators provide cybersecurity training to their employees to help them understand how to better secure their computing devices and sensitive data in their personal and general workspace. Some conventional training methods utilized by the organizations to train the employees rely on one-size-fits-all online cybersecurity training material where a same collection of cybersecurity training modules has to be taken by each employee. Additionally, the cybersecurity training delivered to the employees is typically in form of online materials, lectures, or training manuals. Such conventional methods of providing the cybersecurity training to the employees are often abstract and delivered out of context, because these methods of training may merely present a graphical user interface with textual or illustrated depictions of a cybersecurity threat.

SUMMARY

For the aforementioned reasons, what is therefore needed is a security training apparatus configured to operate an interactive cybersecurity training application, which provides customized and tailored cybersecurity training using augmented reality.

The interactive augmented reality experience that enhances a real world environment with computer-generated perceptual information, such as one or more cybersecurity objects. The overlaid information may add to the environment or mask the environment. As a result, the augmented reality alters user's ongoing perception of their real workspace environment, but including the added cybersecurity objects to offer a perceptually-enriched cybersecurity training experience to the user. When the user interaction corresponds to an allowed action with respect to the generated cybersecurity objects, a cybersecurity training score is updated and overlaid on the real world view.

The security training apparatus uses augmented reality to facilitate customized cybersecurity training for each user by presenting an interface of a cybersecurity threat within a more relatable environment for the user. Augmented reality is based on a computer application that captures the real world environment (via images or video) of each user where the cyber-crime may occur and incorporates computer generated data associated with cybersecurity risk objects that may aid the cyber-crime in that environment. The interactive cybersecurity training comprises the use of live video imagery of the personal workspace environment of each user, which is digitally processed and augmented by the addition of computer generated graphics associated with the cybersecurity risk objects. The cybersecurity risk objects are selected based on the items within the personal workspace environment for each user.

An interactive cybersecurity training application allows a user having an electronic device with a camera or augmented reality goggles to view a real world environment of their personal office workspace that includes computer-generated images of cybersecurity risk objects projected on top of the real world environment of their workspace. A processor may select the cybersecurity risk objects based on the particular items within the real world environment of the workspace. For example, the processor may select a window curtain as a cybersecurity object when a window is present in the workspace. An image of the window curtain is then super-imposed (as an overlay image) on the window, which may illustrate to the user that a presence of the window curtain on the window is essential to avoid a potential cyber-crime. The cyber-crime may involve use of a spy drone viewing inside the workspace of the user through the window to capture images of sensitive data files. An image of the spy drone may be generated to appear in the window of the real world environment.

Virtual cybersecurity risk objects may be overlaid on top of items within a workspace environment that is depicted as a camera image. A server that overlays the virtual cybersecurity risk objects may determine where the camera is relative to the various items in order to determine how to augment the image correctly. For instance, the server rendering the virtual cybersecurity risk objects may determine position and angle of the items, to render the virtual cybersecurity risk objects, and draw the virtual cybersecurity risk objects over the camera image, so that the virtual cybersecurity risk objects appear natural to a user while looking at the camera image. In some cases, each cybersecurity risk object may include a graphical indicator to make the cybersecurity risk object clearly visible to a user. In operation, the server may monitor and collect events generated in the workspace environment. The events may correspond to interactions of the user with the cybersecurity risk objects. The interactions may correspond to actions taken by the user corresponding to the cybersecurity risk objects. When the actions taken by the user are among the legitimate actions, the server may adjust a score of user in a scorecard. The server may then augment and display the scorecard in the camera image.

In one embodiment, a method may include displaying, by a server, on an electronic device operated by a user, a video stream captured of a workspace environment in real time by a camera of the electronic device, the video stream comprises a collection of images; displaying, by the server on the electronic device, a first composite image not captured by the camera, wherein the first composite image is overlaid on an image within the video stream, and wherein the first composite image corresponds to a graphical indicator of a cybersecurity risk object, and wherein the cybersecurity risk object is associated with a data record comprising a permitted action corresponding to the cybersecurity risk object; displaying, by the server on the electronic device, a second composite image not captured by the camera, wherein the second composite image is overlaid on the image within the video stream, and wherein the second composite image corresponds to a scoreboard comprising a value for each of a plurality of permitted actions performed by the user; upon receiving an indication that the user has interacted with the first composite image, determining, by the server, whether the user interaction corresponds to the permitted action; and in response to determining that the user interaction corresponds to the permitted action, updating, by the server, the second composite image to incrementally adjust the value of the permitted action performed by the user.

In another embodiment, a system may include a server configured to display on an electronic device operated by a user, a video stream captured of a workspace environment in real time by a camera of the electronic device, the video stream comprises a collection of images; display on the electronic device, a first composite image not captured by the camera, wherein the first composite image is overlaid on an image within the video stream, and wherein the first composite image corresponds to a graphical indicator of a cybersecurity risk object, and wherein the cybersecurity risk object is associated with a data record comprising a permitted action corresponding to the cybersecurity risk object; display on the electronic device, a second composite image not captured by the camera, wherein the second composite image is overlaid on the image within the video stream, and wherein the second composite image corresponds to a scoreboard comprising a value for each of a plurality of permitted actions performed by the user; upon receiving an indication that the user has interacted with the first composite image, determine whether the user interaction corresponds to the permitted action; and in response to determining that the user interaction corresponds to the permitted action, update the second composite image to incrementally adjust the value of the permitted action performed by the user.

In yet another embodiment, a method may include displaying, by a server, on an electronic device operated by a user, a video stream captured of a workspace environment in real time by a camera of the electronic device, the video stream comprises a collection of images; displaying, by the server on the electronic device, a first composite image, wherein the first composite image is overlaid on an image within the video stream, and wherein the first composite image comprises a graphical indicator of a cybersecurity risk object, and wherein the cybersecurity risk object is associated with a data record comprising a permitted action corresponding to the cybersecurity risk object; upon receiving an indication that the user has interacted with the first composite image, determining, by the server, whether the user interaction corresponds to the permitted action; and in response to determining that the user interaction corresponds to the permitted action, displaying, by the server on the electronic device, a second composite, wherein the second composite image is overlaid on the image within the video stream, and wherein the second composite image comprises a scoreboard having a value for the permitted action performed by the user.

It is to be understood that both the foregoing general description and the following detailed description are exemplary and explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter.

DETAILED DESCRIPTION

Figure 1A:
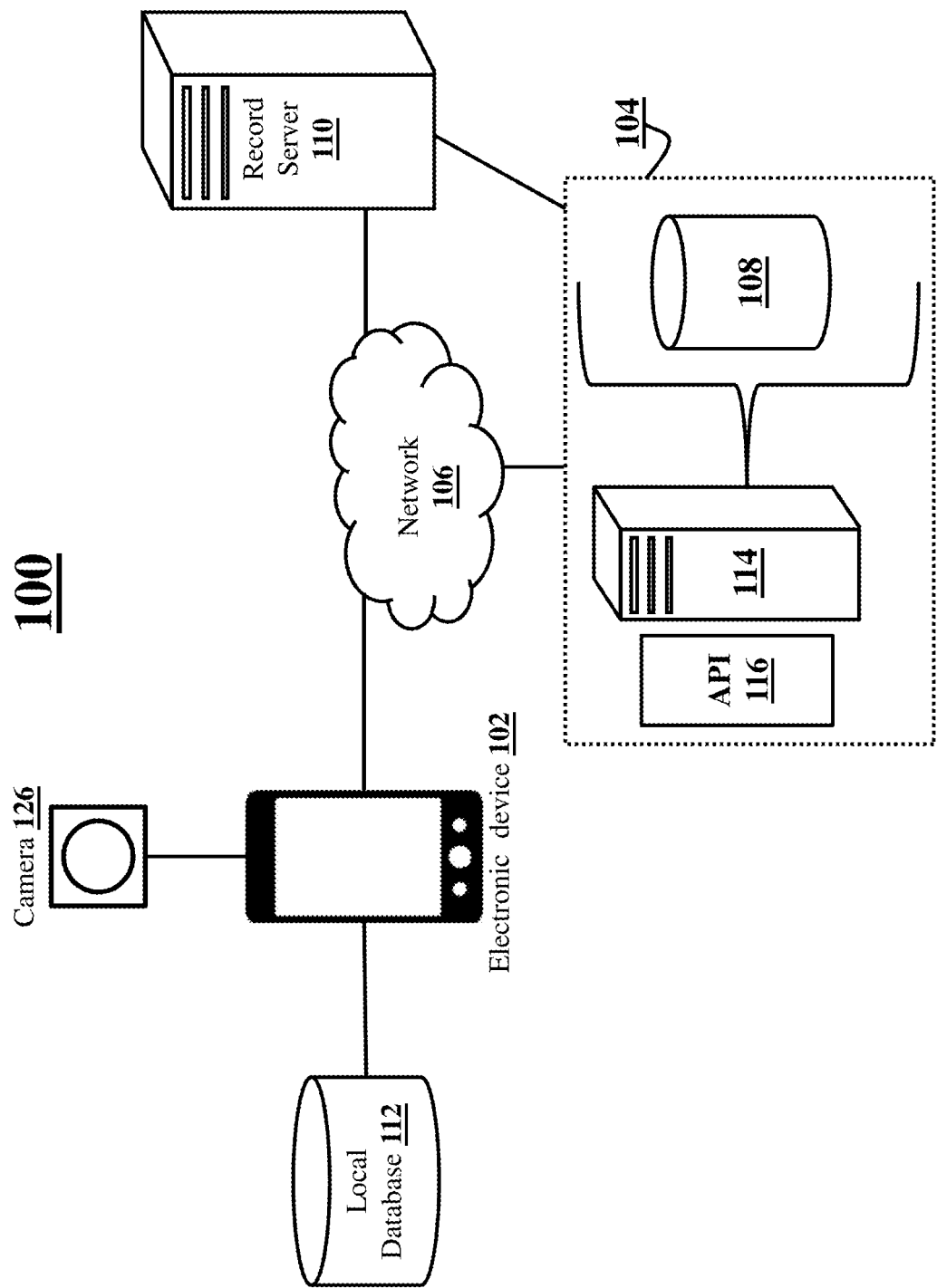
FIG. 1A shows components of a cybersecurity training system, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The subject matter relates generally to a method and an apparatus for viewing and interacting with a real world environment (such as of an office workspace), with a virtual display of imagery (such as cybersecurity risk objects) and/or text (such as a cybersecurity training scoreboard), to give the illusion of viewing the virtual imagery in the office workspace, without actually placing the items within the virtual imagery in the physical environment of the office workspace. The apparatus may use augmented reality technology to facilitate interaction between the real world environment and the virtual images. In augmented reality, a video camera can be used to provide a computer with the same view of the office workspace as seen by the user, and then a computer-generated image containing the cybersecurity risk objects is superimposed on the view. Accordingly, the synthetic computer-generated image containing the cybersecurity risk objects is superimposed upon everyday office workspace objects of the real world. In some cases, a form of physical display such as glasses, goggles or a helmet-mounted display may be used to project or superimpose a computer-generated image of the cybersecurity risk objects onto the user's view of the real world personal office workspace. The system may analyze the viewer's image of the personal office workspace in real-time to identify the contents within the image, and adjusts the computer-generated image containing the cybersecurity risk objects to correspond with the actual view. For instance, the system may determine a location of a desktop computer within the image of the office workspace, and then place the computer-generated image containing a paper note (with passwords) next to the desktop computer in the image.

In operation, a user viewing the office workspace using an electronic device such as mobile phone, glasses, goggles or a helmet-mounted display may view a first graphical indicator of a paper note image. The first graphical indicator may be disposed within a field of view of the user, and may visually distinguish the paper note image from all other items placed within the office workspace. The first graphical indicator may be in control of the user such that manipulation of the first graphical indicator is intended to be communicative of user instructions. The user may interact with the first graphical indicator through hand gestures, tool gestures, or voice commands. The first graphical indicator may be selectively positioned for purposes of communicating instructions to an applications program controlling a display of the electronic device, in response to the user interaction with the first graphical indicator. In response to receiving the instructions, the applications program may cause a message to pop up on the display. The message may include a text memo. The text memo may include information indicating that keeping passwords next to the computer is a cause of cybersecurity concern, and must be avoided. When the user reads and acknowledges the receipt of the message, the applications program updates user's score in the cybersecurity training. An image of updated cybersecurity training scoreboard is then superimposed adjacent to the first graphical indicator on the display. At a later time, whenever the user again interact with the first graphical indicator, an image of the most updated version of the scoreboard is superimposed adjacent to the first graphical indicator on the display. Similarly, the user may interact with other graphical indicators on the display. The other graphical indicators may be associated with other cybersecurity objects. When the user interacts with the other graphical indicators, the scoreboard is again updated, and an image of the updated scoreboard is superimposed on the display.

FIG. 1A shows an example of a cybersecurity training system 100. The system 100 may include an electronic device 102, a training processing system 104, a network 106, a record server 110, and a local database 112 of the electronic device 102. The training processing system 104 may include a server 114, an Application Programming Interface (API 116), and a database 108. The electronic device 102 and components of the training processing system 104 are connected to each other and communicate via the network 106. The network 106 may be a medium that also connects the record server 110 of the security system 100.

Examples of a network 106 may include, but are not limited to, private or public LAN, WLAN, MAN, WAN, and Internet. The network 106 may include both wired and wireless communications according to one or more standards and/or via one or more transport mediums. The communication over the network 106 may be performed in accordance with various communication protocols such as Transmission Control Protocol and Internet Protocol (TCP/IP), User Datagram Protocol (UDP), and IEEE communication protocols. In one example, the network 106 may include wireless communications according to Bluetooth specification sets, or another standard or proprietary wireless communication protocol. The network 106 may also include communications over a cellular network, including, e.g. a GSM (Global System for Mobile Communications), CDMA (Code Division Multiple Access), or EDGE (Enhanced Data for Global Evolution) network.

Figure 1B:
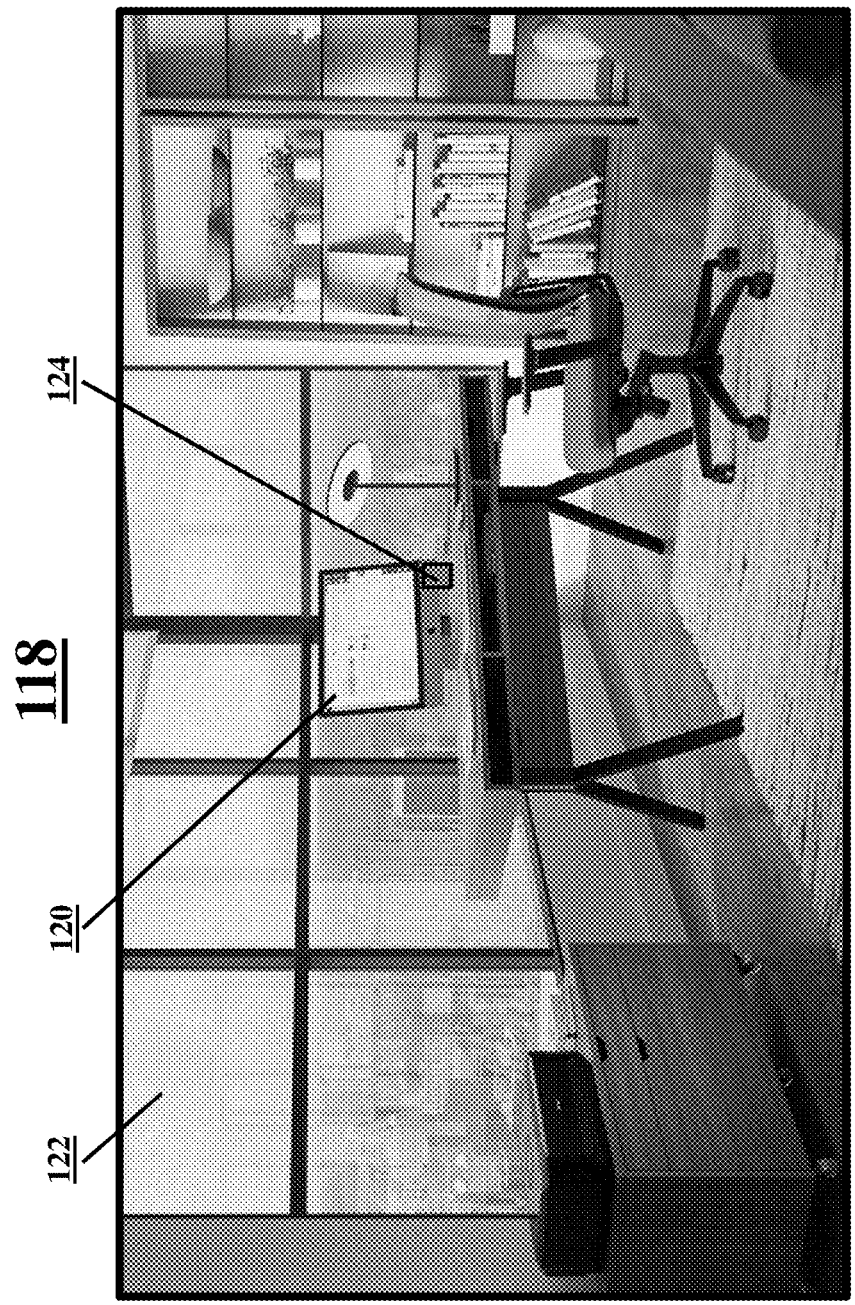
FIG. 1B illustrates an isometric view of a workspace environment utilized for providing interactive cybersecurity training, according to an embodiment.

An electronic device 102 may be operated by a user, and configured for executing an augmented reality application. The augmented reality application may be a cybersecurity training application. The electronic device 102 may be communicably connected via the Internet to a server 114 and/or a database 108, which may be configured for storing and processing information that may be used by the cybersecurity training application. For instance, the database 108 may include information used by the cybersecurity training application, during a process of recognizing items within images captured of a workspace 118 (as depicted in the FIG. 1B), by a camera 126 of the electronic device 102. In an example embodiment, the camera is integrated in the electronic device, but the camera can be separate from the electronic device and communicatively coupled thereto. The database 108 may further include various cybersecurity objects, which may be retrieved by the cybersecurity training application for augmenting over a corresponding item recognized by the cybersecurity training application.

In operation, the user may physically enter the workspace 118 along with the electronic device 102. The workspace 118 may contain items such as a desktop computer 120 and a window 122. The user may use the electronic device 102 to view the items within the workspace 118. The camera 126 of the electronic device 102 may capture images and/or videos containing image frames of the workspace 118, and feed captured images into the cybersecurity training application. The cybersecurity training application is associated with a server 114. The server 114 may retrieve the images from the cybersecurity training application. The server 114 may execute image processing algorithms to normalize the images and then recognize various items such as the desktop computer 120 and the window 122 from the images. In particular, the server 114 may execute vision based recognition techniques to recognize whether a particular item is present in the images. The execution of vision based recognition technique may result in the server 114 extracting features from the images, and then matching the extracted features with reference features associated with various items stored in a database 108. By matching the reference features with the extracted features, the server 114 may determine whether an item is known. When the item is found to be known, the server 114 may subject the item to a position and/or an orientation process where the position and the orientation of the item is estimated on the basis of the information in the images and various camera parameters. The information in the images may include information associated with a current state and a previous state of the item determined based on a current image and a previous image capturing the item. Using the image processing algorithms, the server 114 is able to identify multiple items in a scene captured by a camera as quickly as possible, and track each recognized item with accuracy.

Upon recognition of the items, as well as the position and the orientation of the items, the server 114 may identify the cybersecurity objects associated with the recognized items from the database 108. A relationship between each cybersecurity object and each recognized item is stored in a database 108. Upon identification of the associated cybersecurity objects, the server 114 may render and display cybersecurity objects (such as a paper note 124) together with related recognized item (such as the desktop computer 120). Thus, when user moves the electronic device 102 around the workspace 118, the user is able to view the paper note 124 adjacent to the desktop computer 120 in real-time. This is because the server 114 is quickly able to recognize the items within the images as all information within the images is processed in real-time without degradation to the augmented reality user experience. The delay time between the moment the item (such as the desktop computer 120) appears in the image and the server 114 adding augmented reality content (such as the paper note 124) on top of the item is not noticeable to the user. During the delay time nothing is happening on the screen of the electronic device 102, so the user doesn't know if the paper note 124 is augmented or not.

The paper note 124 may be associated with a graphical indicator. The graphical indicator may visually distinguish the paper note 124 from all other items within the personal office workspace 118. The graphical indicator is in control of the user such that manipulation of the graphical indicator is intended to be communicative of user instructions. The user may use the electronic device 102 to interact with the graphical indicator through hand gestures, tool gestures, or voice commands. The graphical indicator is selectively positioned for purposes of communicating instructions to the server 114 controlling the display of the electronic device, in response to the user interaction with the graphical indicator. In response to receiving the instructions, the server 114 may cause a notification to pop up on the display. The notification may include a text message. The text message may include information informing the user that keeping the paper note 124 next to the desktop computer 120 is a cause of cybersecurity concern, as the paper note 124 contains user name and password information, and must be avoided. When the user reads and acknowledges the receipt of the text message, the server 114 updates user's score in a scoreboard corresponding to a cybersecurity training. An image of updated scoreboard is then superimposed adjacent to the graphical indicator on the display. At a later time, whenever the user again interact with the graphical indicator, an image of the utmost updated version of the scoreboard is superimposed adjacent to the graphical indicator on the display.

An electronic device 102 is a portable or non-portable computing device that performs operations according to programming instructions. The electronic device 102 may include a processor or a microprocessor for performing computations for carrying the functions of the electronic device 102. The processor may include a graphics processing unit specialized for rendering and generating computer-generated graphics. The examples of the electronic device 102 may include, but are not limited to, a cellular phone, a tablet computer, a head-mounted display, smart glasses, wearable computer glasses, a personal data assistant, or personal computer. In augmented reality, the electronic device 102 may be used to project or superimpose a computer-generated image (of a paper note 124) onto the user's view of the real world (such as of the workspace 118).

The electronic device 102 may include an operating system for managing various resources of the electronic device 102. An API 116 associated with the operating system may allow various application programs to access various services offered by the operating system. For example, the API 116 may be configured for setting up wired or wireless connections to a training processing system 104. As a result the electronic device 102 is capable of communicating with various devices of the training processing system 104 through a network 106 using wired or wireless communication capabilities. For ease of explanation, FIG. 1A shows a single mobile device functioning as the electronic device 102, however, it should be appreciated that some embodiments may comprise any number of devices capable of performing the various tasks described herein.

The electronic device 102 may include an imaging equipment to capture images and videos of the workspace 118, such as camera 126. A captured video may contain image frames. The camera 126 may also include an image sensor. The camera 126 may use the image sensor to generate a stream of images, which may be stored in a local database 112. The images may be accessible by a cybersecurity training application. The images generated by the camera 126 and buffered in the local database 112, may be displayed by a display of the electronic device 102. The display may be implemented as a light emitting display for presentation of the images in an interactive and a visual form. The display may include glasses for projection of visual information (such as a computer-generated image of a paper note 124) onto real world items (such as the desktop computer 120) within the workspace 118. The display may include a head-mounted display system configured for optically presenting information into the eyes of the user through a virtual retinal display.

The electronic device 102 may include input and output devices such as cameras, sensors, touch screen, keypad, microphone, mouse, touch screen display, and a graphical user interface. The input and output devices may allow user interaction with various programs and computer software applications configured to communicate with the training processing system 104 in order to complete a cybersecurity training. A user operating the electronic device 102 may have a cybersecurity training application installed on the electronic device 102 from which user access and interact with the training processing system 104 to complete the cybersecurity training as an augmented reality experience.

The cybersecurity training application may be implemented in a processor of the electronic device 102. The implementation of the cybersecurity training application may be as a computer program product, stored in non-transitory storage medium, when executed on the processor. The cybersecurity training application may be a software stack running on the operating system of the electronic device 102. The cybersecurity training application may have a protocol layer and a user interface layer where each layer may be responsible for specific functions. The protocol layer may communicate with the operating system, and manages various connections of the electronic device 102 over the communication network 106. The protocol layer may communicate with the user interface layer. The protocol layer may also be arranged to control the user interface layer to present augmented reality information to the user via a user interface of the cybersecurity training application, and to receive information from the user via the user interface.

The electronic device 102 may run a web browser. The web browser may access and present a cybersecurity training web application. The cybersecurity training web application may be executed by a processor of the electronic device 102 or a server 114, and allows the user to complete an interactive cybersecurity training using the cybersecurity training web application executed on the electronic device 102. The electronic device 102 may execute the cybersecurity training web application outside of the web browser, for example, an operating system-specific cybersecurity training application that accesses and presents information processed by the processor to complete the interactive cybersecurity training.

The cybersecurity training application may include various image processing algorithms. In some embodiments, the cybersecurity training application is in communication with a server 102 that is executing the image processing algorithms. The image processing algorithms may continuously process various images of the workspace 118 captured by a camera of the electronic device 102. The images are processed to identify various items captured within the images. In operation, the execution of the image processing algorithms may result in extraction of features associated with potential items from each image. Then, the server 102 matches the extracted features with one or more features stored in the local database 112. When a predetermined number of extracted features for a potential item matches with the features stored in the database 108, the server 102 identifies an item. The server 102 may then execute additional algorithms to determine a position, a size, and an orientation of the identified item. The server 102 may execute the algorithms in different modes. In one mode, the algorithms may be configured for fast detection of the items in each captured image on the basis of a number of pre-loaded target items. In another mode, the algorithms may be configured for accurate determination of information such as the position, the size, and the orientation of the previously recognized items.

Upon successful identification of an item within an image of the workspace 118, the cybersecurity training application may execute various protocols to associate an item identifier to the identified item. The item identifier may be used for retrieving an associated cybersecurity risk object from a database 108. The cybersecurity training application may then use the position, the size, and the orientation of the item to scale, transform and/or rotate the cybersecurity risk object associated with the identified item. The cybersecurity risk object is then displayed on a user interface of the electronic device 102 as graphical overlay superimposed on the image to form augmented reality view.

The cybersecurity risk object may be associated with a graphical indicator. The graphical indicator may visually distinguish the cybersecurity risk object from all other items within the image. In one example, the graphical indicator may correspond to a particular color. Accordingly, the cybersecurity risk object may be displayed in a particular color. In another example, the graphical indicator may correspond to a particular type of animation. Accordingly, the cybersecurity risk object may be displayed as the particular type of animation. In yet another example, the graphical indicator may correspond to a particular type of size. Accordingly, the cybersecurity risk object may be displayed in the particular size. The graphical indicator is in control of the user such that manipulation of the graphical indicator is intended to be communicative of user instructions. The user may use the electronic device 102 to interact with the graphical indicator through hand gestures, tool gestures, or voice commands. The graphical indicator is selectively positioned for purposes of communicating instructions to the server 114 controlling the display of the electronic device 102, in response to the user interaction with the graphical indicator. In response to receiving the instructions, the server 114 may cause a message to pop up on the display. The message may include a text memo. The text memo may include information informing the user that keeping the cybersecurity risk object next to the item is a cause of cybersecurity concern, and must be avoided. When the user reads and acknowledges the receipt of the message, the server 114 updates user's score in a cybersecurity training scoreboard. The image of the updated cybersecurity training scoreboard is then displayed on the display of the electronic device 102 as graphical overlay superimposed adjacent to the item to form an augmented reality view.

A local database 112 is hosted on an electronic device 102. The local database 112 is in communication with a processor of the electronic device 102 where the processor is capable of executing the various commands of a database management system. The local database 112 may be part of the electronic device 102. The local database 112 may be a separate component in communication with the electronic device 102 and devices of a training processing system 104.

The local database 112 is capable of storing data such as device identification data and user identification data in a plaintext format and/or an encrypted version. The device identification data may include information associated with a size of a display screen of the electronic device 102, a type of the display screen, a resolution of the display screen, a type of the electronic device 102, a camera of the electronic device 102, transmitters of the electronic device 102, receivers of the electronic device 102, and sensors of the electronic device 102. The user identification data may include information associated with the user such as a location of a workspace of a user, a name of each item within the workspace, a location of each item within the workspace, and scorecard history of the user.

The local database 112 may be in communication with a system database 108 via the network 106, and include a non-transitory machine-readable storage media capable of exchanging, receiving, storing, updating, and/or querying data records stored among them. The local database 112 and the system database 108 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and management functions generated by the server 114 and/or the electronic device 102.

A server 114 is a computing device comprising a processor, and capable of performing various tasks and processes described herein. Non-limiting examples of the server 114 may include a server computer, a desktop computer, a laptop computer, a tablet computer, or any other telecommunications or computing device used to interact with various web application services and computer software applications. For ease of explanation, FIG. 1A shows a single computing device functioning as the server 114, however, it should be appreciated that some embodiments may comprise any number of servers capable of performing the various tasks described herein.

The server 114 may host computer files associated with an augmented reality application. The augmented reality application may be a cybersecurity training application or a cybersecurity training website. The server 114 may execute software applications configured to host the augmented reality application (e.g., Apache®, Microsoft IIS®), which may generate and serve various augmented reality application webpages to an electronic device 102. The augmented reality application may be used to access data stored in the database 108 and generate augmented reality based cybersecurity training for a user. The database 108 may include images associated with various items within a workspace 118, images associated with cybersecurity objects, and a location of the workspace 118 of a user.

The server 114 may require user authentication to access the augmented reality application on the electronic device 102, based upon a set of user authorization credentials (e.g., username, password, biometrics, cryptographic certificate). In such implementations, the server 114 may access the database 102 configured to store user credentials, which the server 114 may reference to determine whether a set of entered credentials entered in the electronic device 102 purportedly authenticating the user match an appropriate set of credentials that identify and authenticate the user. Similarly, in some implementations, the server 114 may generate and serve the augmented reality application webpages to the electronic device 102 based upon a user role within the system 100. In such implementations, the user role may be defined by data fields in user records stored in the database 108, and authentication of the user and user role may be conducted by the server 114 by executing an access directory protocol. The server 114 may then be instructed to generate the augmented reality application webpage content, access or generate data stored in the database 108, according to the user role defined by the user record in the database 108.

The server 114 is configured to receive image data from the electronic device 102 via the augmented reality application. The image data may include various image frames of a workspace 118. The server 114 may convert the image data into an augmented reality field of view for representing the image data. In some cases, the server 114 may be configured to construct the augmented reality representing a model of the workspace 118, and its associated items, based on the image data and computer generated data. The computer generated data may include images of various cybersecurity objects. The server 114 may stitch the image data and the computer generated data together to create the augmented reality including visual data, audio data, or other types of data. The visual data may be stitched together using various techniques include recognizing item features, possible through scale-invariant feature transform registration, to combine the images.

When constructing the augmented reality, the server 114 may stitch together different types of data that are associated with each other. For example, a desktop computer 120 within the image of the workspace 118 may be stitched with the computer generated image of the cybersecurity object such as a paper note 124. The image of the paper note 124 is then superimposed adjacent to the desktop computer 120 to form the augmented reality, which is then streamed in real time on the display screen of the electronic device 102, as the user is viewing the workspace 118 via the electronic device 102.

A record server 110 is hosted by a third party that may provide GPS based location service. The record server 110 may communicate and exchange information with a server 114. The record server 110 may receive location information of an electronic device 102 as the electronic device 102 moves within the workspace 118, and transmit the location information to the server 114. The record server 110 may further store location coordinates of each user's workspace within an overall building workspace in a database 108. The record server 110 may further store information associated with description and position of all items placed in each user's workspace in the database 108. The information may include images of all items, images of the workspace, and location coordinates of each item within the each user's workspace.

The record server 110 may be in communication with a sensor. The sensor is positioned within the workspace 118, and is in communication with a transmitter of the electronic device 102. The sensor may determine a location and a position of the electronic device 102 based on strength of signals received from the transmitter. A sensor processor of the sensor may generate sensor data, which may include current location information of the electronic device 102. The sensor processor may transmit the sensor data collected during the sensor operations for subsequent processing to the record server 110. Additionally or alternatively, the sensor processor may be connected to or housed within the sensor. The sensor processor may comprise a microprocessor that executes various primary data processing routines, whereby the sensor data received at the record server 110 has been partially or completely pre-processed as useable location data.

The record server 110 may transmit the sensor data including the current location data of the electronic device 102 to the server 114. The server 114 on receiving current location data of the electronic device 102 may identify workspace information associated with the current location data. For example, when the server 114 may determine that the electronic device 102 is in a first location, and a first workspace is located at the first location, the server 114 may then retrieve information of the first workspace from a database 108. The information may include images of the first workspace, images of all items within the first workspace, and location coordinates of each item within the first workspace. The server 114 may then process the information and combine the processed information with the computer generated images of the cybersecurity objects, to create an interactive experience of a real-world environment of the first workspace, where the items that reside in the real-world environment of the first workspace are augmented by computer-generated perceptual cybersecurity objects across multiple sensory modalities.

Figure 2:
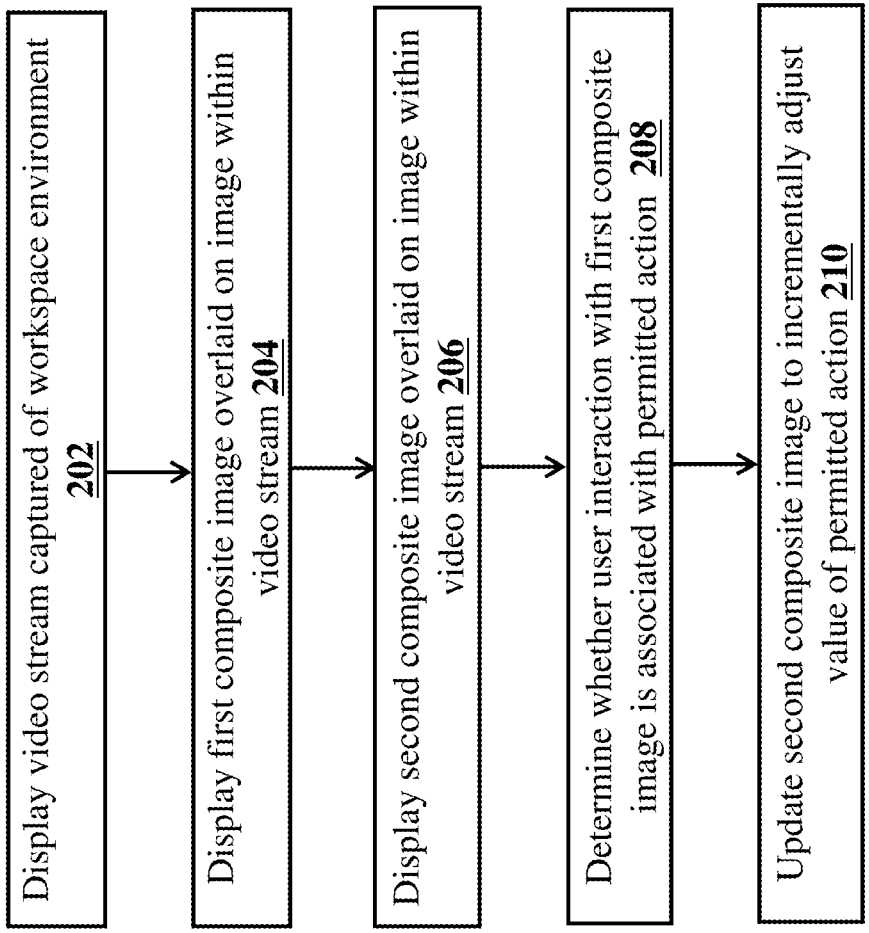
FIG. 2 shows execution of a method corresponding to operations of a cybersecurity training system, according to an embodiment.

FIG. 2 shows execution of a method corresponding to operations of a cybersecurity training system, according to a method 200. The method 200 shown in FIG. 2 comprises execution steps 202, 204, 206, 208, and 210. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 200 of FIG. 2 is described as being executed by a single server computer, referred to as a system server in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as an electronic device or a server described herein.

In a first step 202, a server may transmit a request to an electronic device of a user for a wireless connection when the electronic device moves into a workspace such as an office workspace of the user. When the wireless connection is established, the electronic device and the server may communicate with each other. In some cases, the electronic device may transmit the request to the server for wireless connection when the electronic device moves into the office workspace.

The server and the electronic device may be associated with communication components, transmitters, and receivers. In one example, a transmitter positioned within the office workspace and associated with the server may first identify a receiver of the electronic device, and then transmit a request for connection to the receiver of the electronic device. In another example, a transmitter of the electronic device may transmit a request for a connection to a receiver associated with the server. The transmitter and the receiver may communicate to each other with or without communication components. The communications component may include electromechanical components (e.g., processor, antenna) that allow the communications component to communicate various types of data with the receivers and the transmitters. In some implementations, communications signals between the transmitter and the receiver may represent a distinct channel for hosting communications. The data may be communicated using the communications signals, based on predetermined wired or wireless protocols and associated hardware and software technology. The communications component may operate based on any number of communication protocols, such as Bluetooth®, Wireless Fidelity (Wi-Fi), Near-Field Communications (NFC), ZigBee, and others. However, it should be appreciated that the communications component is not limited to these technologies, but may include radar, infrared, and sound devices as well.

Upon the communication is established between the server and the electronic device, the server may retrieve a video from a database based on current location data of the electronic device. The database may include videos for each workspace and location information for each workspace. The videos may include image frames capturing various items within the workspace and an environment of the workspace. When the server determines that the electronic device is in a first workspace at a first location, the server may retrieve a first video associated with the first workspace from a database. The first video may include a video stream containing image frames of the workspace where the user is present. The server may then display the video stream via an augmented reality application running on the electronic device operated by a user. The augmented reality application is an interactive cybersecurity training application.

In another embodiment, a server may be directly or indirectly associated with a camera present in the workspace. The camera may be operable in a regular mode and a panoramic mode, and in different angles to create a 3D model of an image or a video of the workspace. In the regular mode, the camera captures and produces individual still digital images of the workspace. In the panoramic mode, the camera captures a series of overlapping digital images to be used in constructing a panoramic image of the workspace. The memory of the camera stores the instructions for the processor for implementing the panoramic mode.

Upon the communication is established between the server and the electronic device, the server may determine a current location of the workspace where the user is present using the camera. For instance, the server may activate the camera in the workspace to capture the images and the video of the workspace in real time. The camera may capture a series of exposures to produce the panoramic image within a region of the workspace. The camera may include a zoom lens for directing image light from a scene toward an image sensor, and a shutter for regulating exposure time. Both the zoom and the shutter are controlled by a microprocessor in response to control signals received from the server including a shutter release for initiating image capture. A flash unit may be used to illuminate the scene when needed. The image sensor includes a discrete number of photo site elements or pixels arranged in an array to form individual photo sites corresponding to the pixels of the image. The image sensor can be either a conventional charge coupled device sensor or a complementary metal oxide semiconductor imager.

Once the video of the workspace is captured, a processor associated with the camera within the workspace may transmit the captured video to the server. The server may then execute image processing protocols and image processing algorithms on the received data to identify each item captured in the received data, and a location of each item within the workspace. The server may then store information associated with each item such as a type of item (a computer, a window, etc.), a size of the item, a name of the item, and geographic coordinates of each item within the workspace in the database.

The server may then display the video stream on a display screen via the cybersecurity training application running on the electronic device operated by the user. The video stream may include multiple visual images. The display screen may be an output device, which displays information such as the image or the video content in pictorial form. The display screen may include a display device, circuitry, casing, and power supply. The display screen may be a thin film transistor liquid crystal display, light-emitting diode display, or an organic light-emitting diode display. The display screen may be connected to the user computing device via digital visual interface, HDMI, display port, thunderbolt, low-voltage differential signaling or other proprietary connectors and signals.

In a next step 204, a server may display a first composite image not captured by the camera on the display screen via the cybersecurity training application running on the electronic device. For instance, the server may overlay the first composite image on an image frame within the video stream currently being streamed on the electronic device. The first composite image may include a graphical indicator of a cybersecurity risk object. The cybersecurity risk object is associated with a data record comprising a permitted action corresponding to the cybersecurity risk object. The permitted action may include an activity associated with interaction with the cybersecurity risk object. The interaction may include reading information associated with the cybersecurity risk object and taking a test corresponding to the cyber-crime prevention.

In order to efficiently and correctly overlay the first composite image on the image frame, the server may first recognize a target item within the image frame. In particular, the server may use vision-based object recognition algorithm in order to recognize whether a particular target item is present in the image frame generated by the camera. Furthermore, the server may use an orientation algorithm to determine position and/or orientation information of the target item based on information in the image frame and camera parameters. Upon recognizing the target item and its positon within the image frame, the server may then render and display a cybersecurity risk object together with the recognized target item on the display screen. For example, the target item may be a wall window and the cybersecurity risk object may be a window curtain. The server may overlay the image of the window curtain next to the image of the wall window, and thereby allowing enrichment and augmentation of a real scene of the workspace captured in the video stream with additional computer generated content such as the cybersecurity objects, which may be presented to the user in a form of a graphical layer overlaying the real-world scenery in the augmented reality view, and as a result providing an augmented reality user-experience on their electronic device.

In a next step 206, a server may display a second composite image not captured by the camera on the electronic device. The second composite image is overlaid on the image within the video stream. The second composite image may include a scoreboard associated with an interactive cybersecurity training received via an interactive cybersecurity training application. The scoreboard may include a value for each of a plurality of permitted actions performed by the user.

In a next step 208, a user may interact with the graphical indicator of the cybersecurity risk object via a user interface of the electronic device. In another embodiment, the user may interact with the graphical indicator of the cybersecurity risk object via audio commands. Upon the interaction, a message may be displayed on the display screen. The message may include permitted actions to be performed by the user. The permitted actions may include reading notes contained in the message.

The server may receive a notification from the interactive cybersecurity training application specifying the user interaction with the graphical indicator of the cybersecurity risk object. In some cases, the server may receive the notification from the electronic device specifying the user interaction with the graphical indicator of the cybersecurity risk object. The notification may further include all actions performed by the user in response to the interaction with the graphical indicator of the cybersecurity risk object. The server may then compare a list of actions performed by the user against a list of permitted actions associated with the cybersecurity risk object.

In a next step 210, when a server determines that the user has performed the permitted actions, the server may then update the second composite image to incrementally adjust the value of the permitted action performed by the user. For example, the scoreboard is updated to reflect that the user has performed the permitted action, and therefore successfully participated in the cybersecurity training. The second composite image may then be overlaid adjacent to the graphic indicator of the cybersecurity risk object.

Figure 3A:
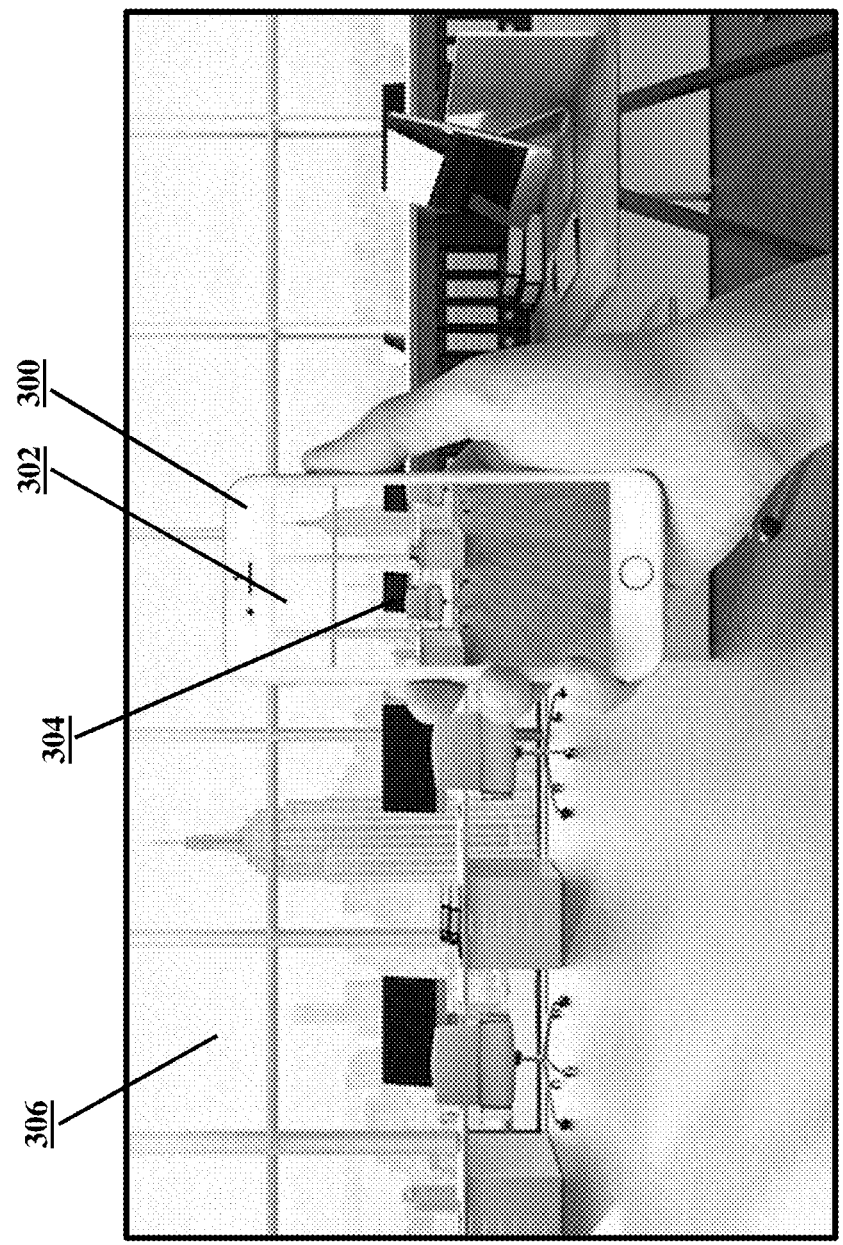
FIG. 3A shows a graphical user interface of an electronic device displaying a cybersecurity training application, according to an embodiment.

FIG. 3A shows a graphical user interface 302 of an electronic device 300 displaying a cybersecurity training application. The cybersecurity training application is an augmented reality application based on augmented reality technology. The electronic device 300 is a mobile device, however, it should be appreciated that some embodiments may include any different electronic device 300 capable of performing various augmented reality tasks described herein. For example, the electronic device 300 may be a display device in form of glasses, goggles, or any other structure that supports and incorporates various components of the electronic device 300, as well as serves as a conduit for electrical and other component connections. The electronic device 300 may include a software product running on a camera device, for example, a cybersecurity training application executing on the mobile device enabled with a camera. The electronic device 300 may further include processors, transmitters, receivers, display screen, sensors, and input devices. The sensors may be MEMS sensors such as accelerometers, global positioning system, and solid state compass, making the sensors suitable for augmented reality platforms.

The graphical user interface 302 may include one or more of display components such as a cathode ray tube, a liquid crystal display, an OLED display, an AMOLED display, a super-AMOLED display, a plasma display, an incandescent light, a fluorescent light, a front or rear projection display, or a light emitting diode indicator. The display 302 may further include an imaging system, which can be implemented with a number of micro display panels, lenses, and reflecting elements to display and project an image. The display panels, lenses, and/or reflecting elements of the imaging system can be implemented with various display technologies, such as implemented with a transparent LCD, or using a projection technology. The projection technology may be implemented using LCD type displays with powerful backlights and high optical energy densities. Alternatively, a micro display and/or reflecting element may be implemented using a reflective technology, such as digital light processing and liquid crystal on silicon that reflects external light, which is reflected and modulated by an optical material.

The graphical user interface 302 may be connected to a processor of the electronic device 300 for entering data and commands in the form of text, touch input, gestures, etc. The graphical user interface 302 may be a touch screen device, but may alternatively be a proximity detector, a sensor, or any input/output device combination capable of sensing gestures and/or touches including a touch-sensitive surface. In addition, the graphical user interface 302 may include components, such as a video input component such as an optical sensor (for example, a camera or imaging technology), an audio input component such as a microphone, and a mechanical input component such as button or key selection sensors, a touch pad sensor, a touch-sensitive sensor, a motion sensor, and/or a pointing device such as a joystick, a touch pad, a touch screen, a fingerprint sensor, or a pad for an electronic stylus. One or more of the graphical user interface 302 devices may function in multiple modes.

Figure 3B:
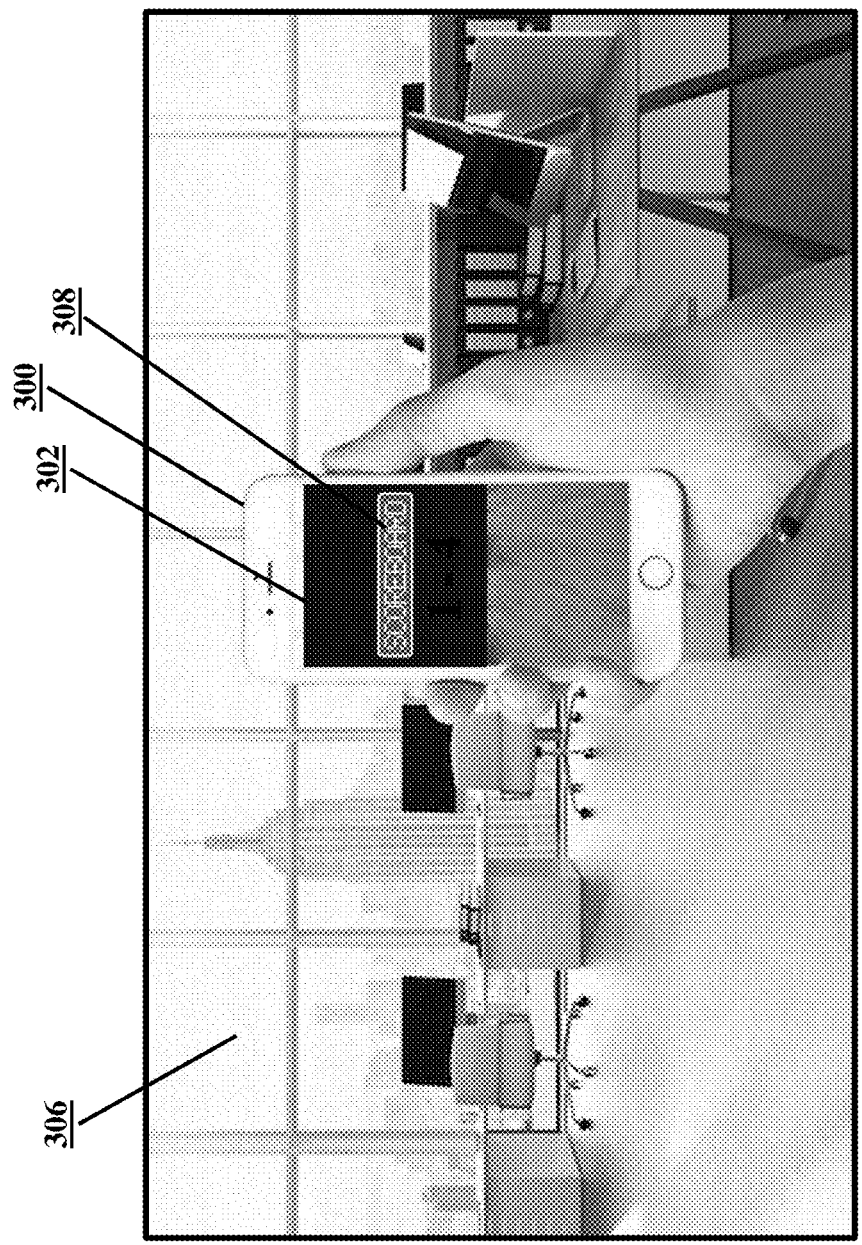
FIG. 3B shows a graphical user interface of an electronic device displaying a cybersecurity training application, according to an embodiment.

The electronic device 300 may employ cameras to intercept a real world view of a workspace 306, and re-display an augmented view of the workspace 306 through the graphical user interface 302 in which the augmented reality imagery is projected through or reflected off the surfaces of the graphical user interface 302. In operation, a user may use the electronic device 300 for viewing and interacting with real world items within the workspace 306 via the cybersecurity training application, with a virtual composite display of cybersecurity object imagery such as a switched on computer 304. A first graphic element corresponding to the switched on computer 304 may be displayed on the graphical user interface 302. The user may then interact with the first graphic element via the graphical user interface 302 through hand gestures, tool gestures, or voice commands. A message may then be presented on the graphical user interface 302. The message may include information for a user that the switched on computer 304 is a cause of cybersecurity concern when the user is away from the switched on computer 304, and therefore the computer 304 must be turned off when away from the computer 304. When the user acknowledges the message, the cybersecurity training application updates user's score in a scoreboard 308 (as shown in FIG. 3B). An image of the scoreboard 308 is then superimposed and displayed adjacent to the first graphical indicator on the graphical user interface 302, to create an interactive experience of a real-world environment of the workspace 306, where the switched on computer 304 residing in the real-world environment is augmented by a computer-generated scoreboard 308.

When a user moves a camera of their electronic device 300 in another direction in the workspace 306, a second graphic element corresponding to a clear window 306 may be displayed on the graphical user interface 302. The user may then interact with the second graphic element via the graphical user interface 302 through hand gestures, tool gestures, or voice commands. A message may then be presented on the graphical user interface 302. The message may include information for a user that the clear window 306 is a cause of cybersecurity concern as spy drones outside the clear window 306 may capture images of data files within the workspace 306, and therefore the clear window 306 should be covered. When the user acknowledges the message, the cybersecurity training application updates user's score in a scoreboard 308 (as shown in FIG. 3B). An image of the scoreboard 308 is then superimposed and displayed adjacent to the second graphical indicator on the graphical user interface 302.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present subject matter.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via memory sharing, message passing, token passing, network transmission, or the like.

The actual software code or specialized control hardware used to implement these systems and methods is not limiting of the subject matter. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   displaying, by a server, on an electronic device operated by a user, a video stream captured of a workspace environment in real time by a camera of the electronic device, the video stream comprises a collection of images;
   displaying, by the server on the electronic device, a first composite image not captured by the camera, wherein the first composite image is overlaid on an image within the video stream, and wherein the first composite image comprises a graphical indicator of a cybersecurity risk object, and wherein the cybersecurity risk object is associated with a data record comprising a permitted action corresponding to the cybersecurity risk object;
   displaying, by the server on the electronic device, a second composite image not captured by the camera, wherein the second composite image is overlaid on the image within the video stream, and wherein the second composite image comprises a scoreboard having a value for each of a plurality of permitted actions performed by the user;
   upon receiving an indication that the user has interacted with the first composite image, determining, by the server, whether a user interaction corresponds to the permitted action; and
   in response to determining that the user interaction corresponds to the permitted action, updating, by the server, the second composite image to incrementally adjust the value of the permitted action performed by the user.

2. The method according to claim 1, further comprising retrieving, by the server, from a database, a plurality of data records associated with a plurality of cybersecurity risk objects.

3. The method according to claim 2, wherein each data record comprises the graphical indicator, wherein the graphical indicator visually distinguishes each cybersecurity risk object present within the image.

4. The method according to claim 3, wherein the graphical indicator is represented as an animated character.

5. The method according to claim 1, wherein the user interacts with the first composite image through hand gestures, tool gestures, or voice commands.

6. The method according to claim 1, wherein the workspace environment comprises one or more items, and wherein each item is associated with a corresponding cybersecurity risk object.

7. The method according to claim 1, wherein a database stores location data of the workspace environment and of each item within the workspace environment.

8. The method according to claim 1, wherein the server tracks location of the electronic device using signals transmitted from transmitters of the electronic device.

9. A system comprising:
a server configured to:
display on an electronic device operated by a user, a video stream captured of a workspace environment in real time by a camera of the electronic device, the video stream comprises a collection of images;
display on the electronic device, a first composite image not captured by the camera, wherein the first composite image is overlaid on an image within the video stream, and wherein the first composite image comprises a graphical indicator of a cybersecurity risk object, and wherein the cybersecurity risk object is associated with a data record comprising a permitted action corresponding to the cybersecurity risk object;
display on the electronic device, a second composite image not captured by the camera, wherein the second composite image is overlaid on the image within the video stream, and wherein the second composite image comprises a scoreboard having a value for each of a plurality of permitted actions performed by the user;
upon receiving an indication that the user has interacted with the first composite image, determine whether a user interaction corresponds to the permitted action; and
in response to determining that the user interaction corresponds to the permitted action, update the second composite image to incrementally adjust the value of the permitted action performed by the user.

10. The system according to claim 9, wherein the server is further configured to retrieve from a database a plurality of data records associated with a plurality of cybersecurity risk objects.

11. The system according to claim 10, wherein each data record comprises a graphical indicator, the graphical indicator visually distinguishing each cybersecurity risk object present within the image.

12. The system according to claim 11, wherein the graphical indicator is represented as an animated character.

13. The system according to claim 9, wherein the user interacts with the first composite image through hand gestures, tool gestures, or voice commands.

14. The system according to claim 9, wherein the workspace environment comprises one or more items, and wherein each item is associated with a corresponding cybersecurity risk object.

15. The system according to claim 9, wherein a database stores location data of the workspace environment and of each item within the workspace environment.

16. The system according to claim 9, wherein the server tracks location of the electronic device using signals transmitted from transmitters of the electronic device.

* * * * *